US 10,829,174 B2

United States Patent
Baruzzo

(10) Patent No.: US 10,829,174 B2
(45) Date of Patent: Nov. 10, 2020

(54) METHOD FOR FIXING A TRAVEL CONTAINER FOR MOTOR VEHICLES TO A MOTOR VEHICLE, TRAVEL CONTAINER FOR MOTOR VEHICLES AND MOUNTING KIT THEREOF

(71) Applicant: PIAGGIO & C. S.p.A., Pisa (IT)

(72) Inventor: Maurizio Baruzzo, Pisa (IT)

(73) Assignee: PIAGGIO & C. S.p.A., Pisa (IT)

( * ) Notice: Subject to any disclaimer, the term of this patent is extended or adjusted under 35 U.S.C. 154(b) by 0 days.

(21) Appl. No.: 15/322,699

(22) PCT Filed: Jul. 3, 2015

(86) PCT No.: PCT/IB2015/055040
§ 371 (c)(1),
(2) Date: Dec. 28, 2016

(87) PCT Pub. No.: WO2016/001896
PCT Pub. Date: Jan. 7, 2016

(65) Prior Publication Data
US 2017/0120979 A1    May 4, 2017

(30) Foreign Application Priority Data

Jul. 4, 2014  (IT) .............................. PD2014A0178

(51) Int. Cl.
*B62J 9/00*    (2020.01)
*B62J 9/20*    (2020.01)
(Continued)

(52) U.S. Cl.
CPC . *B62J 9/20* (2020.02); *B62J 1/12* (2013.01);
*B62J 1/14* (2013.01); *B62J 9/26* (2020.02);
*B65D 25/24* (2013.01); *B65D 55/02* (2013.01)

(58) Field of Classification Search
CPC ....... B62J 9/00; B62J 9/006; B62J 1/12; B62J 1/28; B62J 9/26; B62J 7/04; B62J 9/20; B62J 1/14
(Continued)

(56) References Cited

U.S. PATENT DOCUMENTS 3,779,597 A * 12/1973 Uchida .................. B62J 11/005
                                                      211/4
4,266,703 A *  5/1981 Litz .......................... B62J 9/001
                                                     224/413
(Continued)

FOREIGN PATENT DOCUMENTS

DE   20 2010 008 199 U1   9/2010
EP       1 649 904 A1     4/2006
(Continued)

OTHER PUBLICATIONS

International Search Report and Written Opinion of the International Searching Authority for corresponding International Patent Application No. PCT/IB2015/055040 dated Sep. 28, 2015, 8 pgs.
(Continued)

*Primary Examiner* — Adam J Waggenspack
(74) *Attorney, Agent, or Firm* — Merchant & Gould P.C.

(57) ABSTRACT

A method for fixing a travel container to a motor vehicle includes arranging a vehicle with at least one back seat fixed to a frame of the vehicle. The seat includes a lower plate securable to a frame portion of the vehicle and a seat portion, opposite to the lower plate, is suitable as a user/passenger seat. A travel container has a container body, defining a storage compartment. A fixing plate associated with the container body includes a mount for the travel container. The travel container fixing plate is interchangeable with the lower plate of the seat. The seat is removed to provide access to an under-seat compartment and to the frame portion supporting the seat. The travel container is fixed to the
(Continued)

vehicle to fix the fixing plate of the travel container to the frame portion supporting the seat. The travel container is arranged to replace the seat.

29 Claims, 8 Drawing Sheets

(51) Int. Cl.
    *B62J 1/14*           (2006.01)
    *B62J 1/12*           (2006.01)
    *B62J 9/26*           (2020.01)
    *B65D 25/24*          (2006.01)
    *B65D 55/02*          (2006.01)

(58) Field of Classification Search
    USPC .......................................................... 224/449
    See application file for complete search history.

(56) References Cited

U.S. PATENT DOCUMENTS

| | | | |
|---|---|---|---|
| 5,518,291 A * | 5/1996 | Shaide | B62J 1/12 297/188.04 |
| 5,558,260 A | 9/1996 | Reichert | |
| 6,354,476 B1 * | 3/2002 | Alderman | B62J 7/04 224/413 |
| 6,533,152 B1 * | 3/2003 | Dischler | B62J 9/00 190/9 |
| 6,802,440 B1 * | 10/2004 | Stowell | B62J 9/006 190/110 |
| 7,275,787 B1 | 10/2007 | Grove | |
| 7,377,570 B2 * | 5/2008 | Rondeau | B60N 2/24 180/908 |
| 7,448,664 B2 * | 11/2008 | Karube | B62J 1/12 296/65.02 |
| 7,556,114 B2 * | 7/2009 | Hanagan | B62J 1/12 180/219 |
| 7,571,921 B1 | 8/2009 | Hoeve | |
| D600,459 S * | 9/2009 | Hanagan | D12/410 |
| 9,469,359 B2 * | 10/2016 | Abildtrup | B62J 1/28 |
| 2004/0222679 A1 | 11/2004 | Michisaka et al. | |
| 2004/0239088 A1 | 12/2004 | Rondeau et al. | |
| 2006/0180373 A1 | 8/2006 | Hanagan | |

FOREIGN PATENT DOCUMENTS

| | | |
|---|---|---|
| EP | 1 686 050 A1 | 8/2006 |
| FR | 2 857 327 A | 1/2005 |
| JP | S47-022662 | 11/1972 |
| JP | H02-74480 A | 3/1990 |
| JP | 2002255078 | 9/2002 |

OTHER PUBLICATIONS

Chinese Search Report for corresponding Chinese Patent Application No. 201580035014X dated Jul. 11, 2018, 2 pages.
European Office Action for corresponding European Patent Application No. 15759538.0 dated Jun. 9, 2018, 9 pages.
European Office Action for corresponding European Patent Application No. 15759538.0 dated Oct. 16, 2019, 7 pages.
European Office Action for corresponding European Patent Application No. 18158579.5 dated Jan. 29, 2020, 7 pages.
Indian Office Action for corresponding Indian Patent Application No. 201627044170 dated Nov. 13, 2019, 6 pages.

* cited by examiner

US 10,829,174 B2

METHOD FOR FIXING A TRAVEL CONTAINER FOR MOTOR VEHICLES TO A MOTOR VEHICLE, TRAVEL CONTAINER FOR MOTOR VEHICLES AND MOUNTING KIT THEREOF

This application is a National Stage Application of PCT/IB2015/055040, filed 3 Jul. 2015, which claims benefit of Serial No. PD2014A000178, filed 4 Jul. 2014 in Italy and which applications are incorporated herein by reference. To the extent appropriate, a claim of priority is made to each of the above disclosed applications.

FIELD OF APPLICATION

This invention relates to a method for fixing a travel container for motor vehicles to a motor vehicle, a travel container for motor vehicles and related kit for mounting a travel container for motor vehicles.

STATE OF THE ART

As is known, there is a need in the motor vehicle industry to increase the carrying capacity of the vehicle itself, for example, on long trips, for holidays or for use by particular entities that provide specific services or for the simple individuals seeking high load capacity of the vehicle. In this way, the versatility of a two-wheeled vehicle is improved that is often seen, in its loading capacity, as a handicap, compared to other motor vehicles.

SUMMARY OF THE INVENTION

To increase such load capacity, the know art offers various solutions involving front and rear travel cases and bags or side saddlebags.

The front travel cases or bags are usually fixed on the tank of the vehicle, positioned between the driver and the handlebar. However, these front travel cases or bags entail some disadvantages. In fact, often they hamper the driver's movements, interfering, if of large dimensions, with the turning of the handlebar, the instrumentation and the driver's arms themselves. In addition, they are fixed to the vehicle by means of magnets, if the tank is made of ferromagnetic material, or by means of belts and/or support plates fixed, for example, to the tank cap or to a frame portion below the tank.

It follows, therefore, that, when refuelling, the user must always remove the front travel case or bag to access the tank cap: this operation is very inconvenient, especially if the travel case or bag is heavy and secured by means, such as belts and the like, that are not easily removable.

The rear bags are, instead, positioned on the rear passenger seat and exclusively fixed to the vehicle using special straps. The dimensions of these bags do not exceed the dimensions of the seat.

There are also known solutions of rear travel cases, which are usually fixed to dedicated rear plates for hooking and unhooking, fixed to the carrier rack of the vehicle.

These solutions present additional problems.

In fact, they first require fixing special support plates to the carrier rack; moreover, the travel case is positioned projecting from the vehicle, on the passenger side, with respect to a longitudinal direction of the motor vehicle.

Due to the projecting position of the travel case, it is not possible to overload the case itself, to avoid problems for the frame.

In fact, in this way, especially if loaded with several kilos, they entail a lightening of the front axle and, in any case, an offsetting of the masses with respect to the centre of gravity of the motor vehicle that compromises its dynamics and handling.

Finally, solutions are known of side saddlebags that, however, have the disadvantage of projecting laterally from the outline of the vehicle, making it dangerous to drive in town, due to the increased width of the vehicle.

Often the bags are arranged asymmetrically, i.e., on only one side of the motor vehicle (typically the side opposite the exhaust pipe and, therefore, unbalance the equilibrium of the masses of the motor vehicle.

Moreover, a disadvantage common to all the solutions of the known art listed above consists in the fact that the known bags have a reduced load capacity (often limited to 5-6 kg) precisely because arranged in positions that are offset, unbalanced or uncomfortable for the manoeuvrability of the motor vehicle.

Therefore, there is a need to solve the drawbacks and limitations mentioned in reference to the prior art.

DESCRIPTION OF THE DRAWINGS

Further characteristics and advantages of this invention will be more understandable from the following description of its preferred and non-limiting examples of embodiments, wherein.

The members, or parts of members, in common between the embodiments described below will be indicated with the same reference numbers.

DETAILED DESCRIPTION

Figure 1:
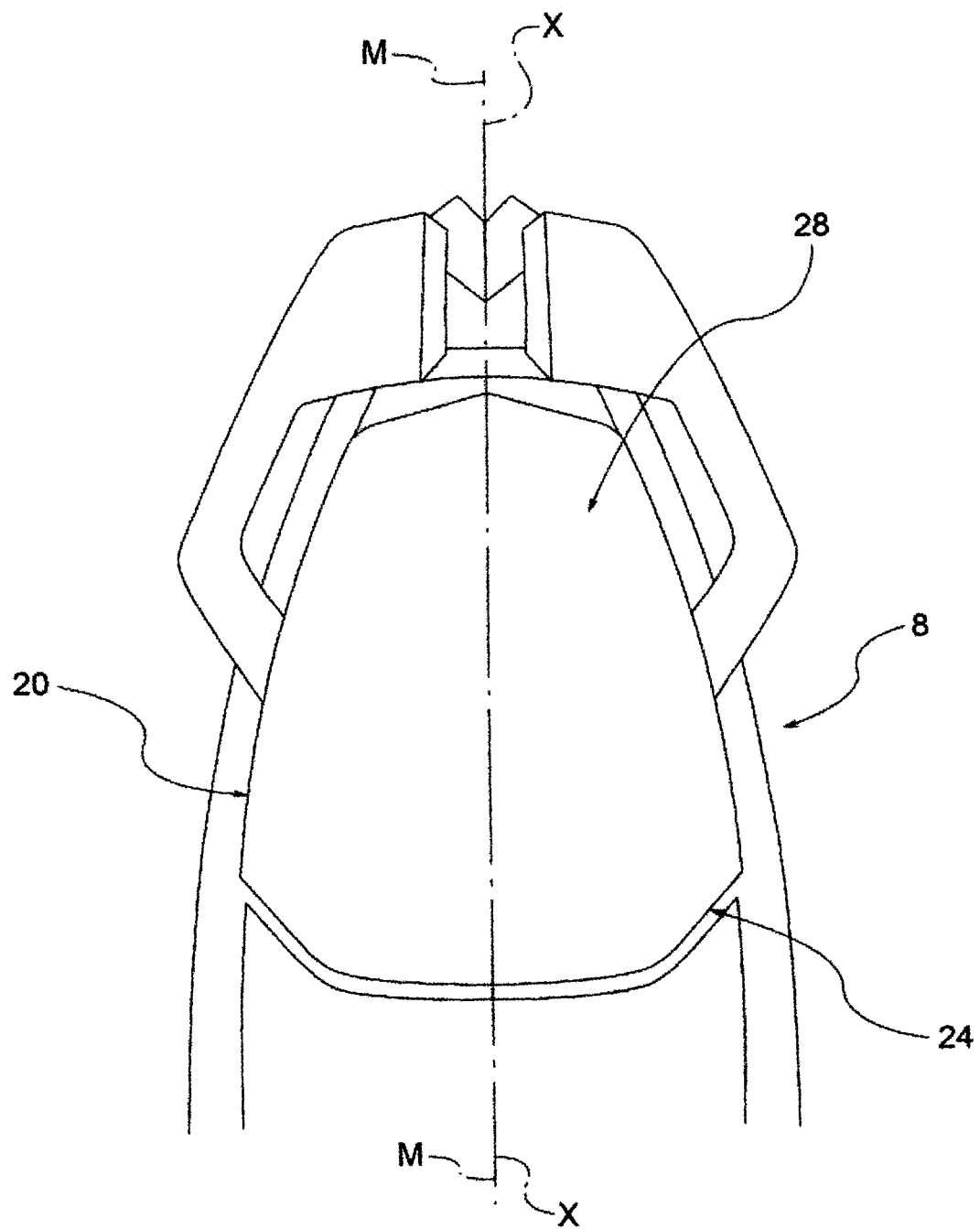
FIG. 1 is a top plan view of a rear portion of a motor vehicle, equipped with a passenger seat and suitable to receive a travel container according to this invention.
Figure 2:
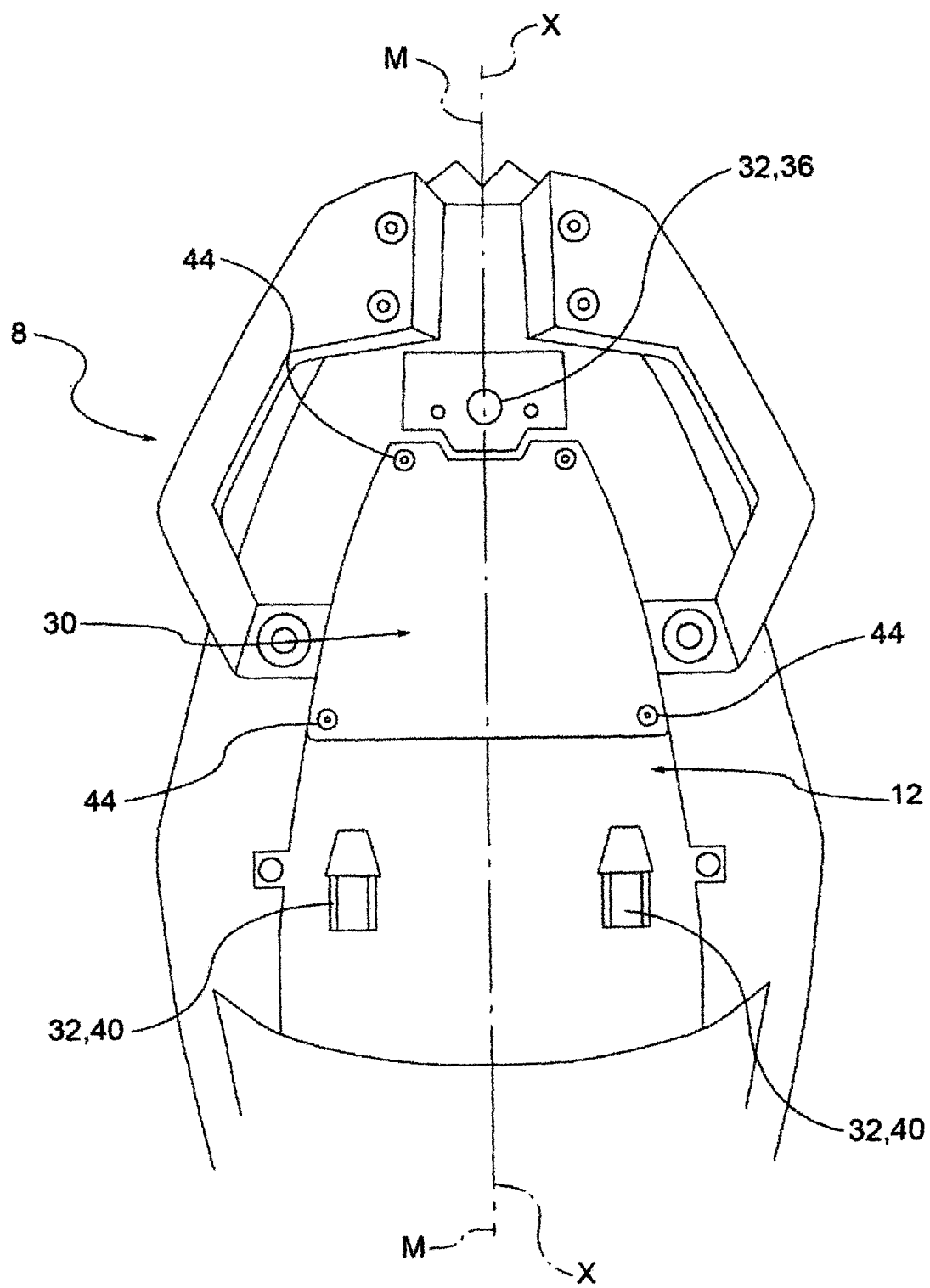
FIG. 2 is the view of FIG. 1 in which the passenger seat has been removed.
Figure 3:
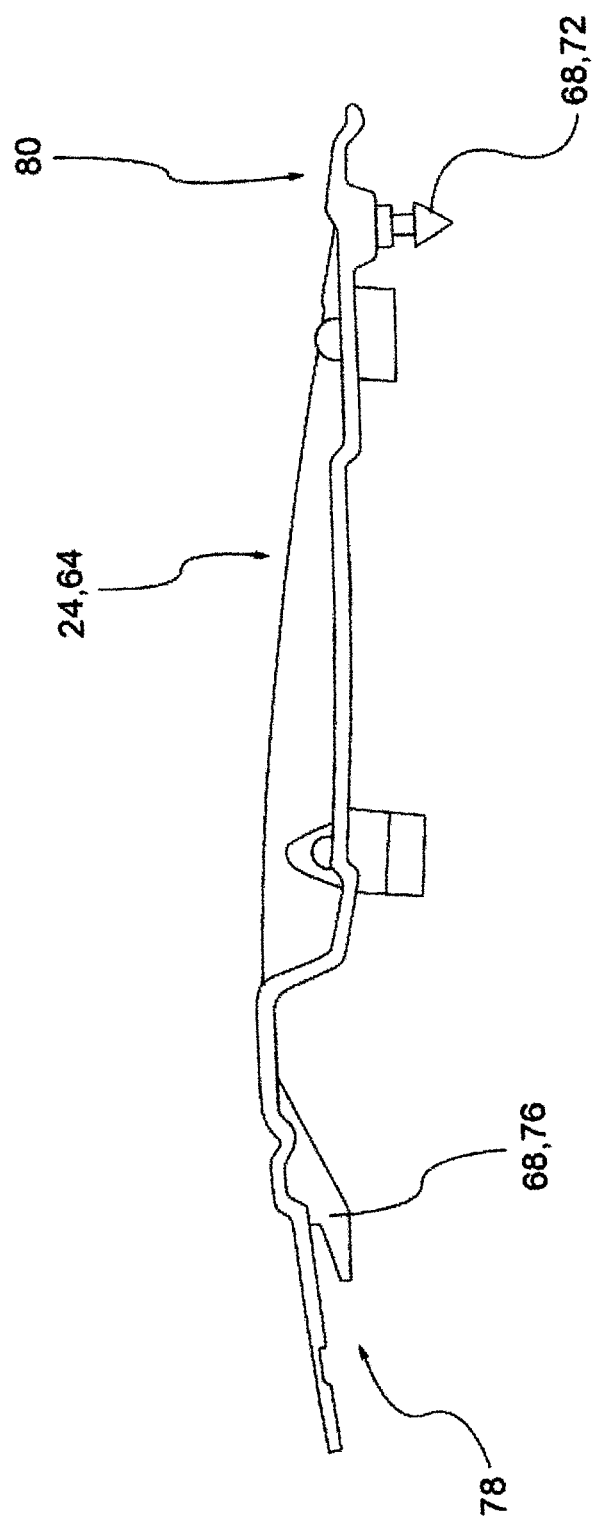
FIG. 3 is a side view of the fixing plate of a travel container according to this invention.
Figure 4:
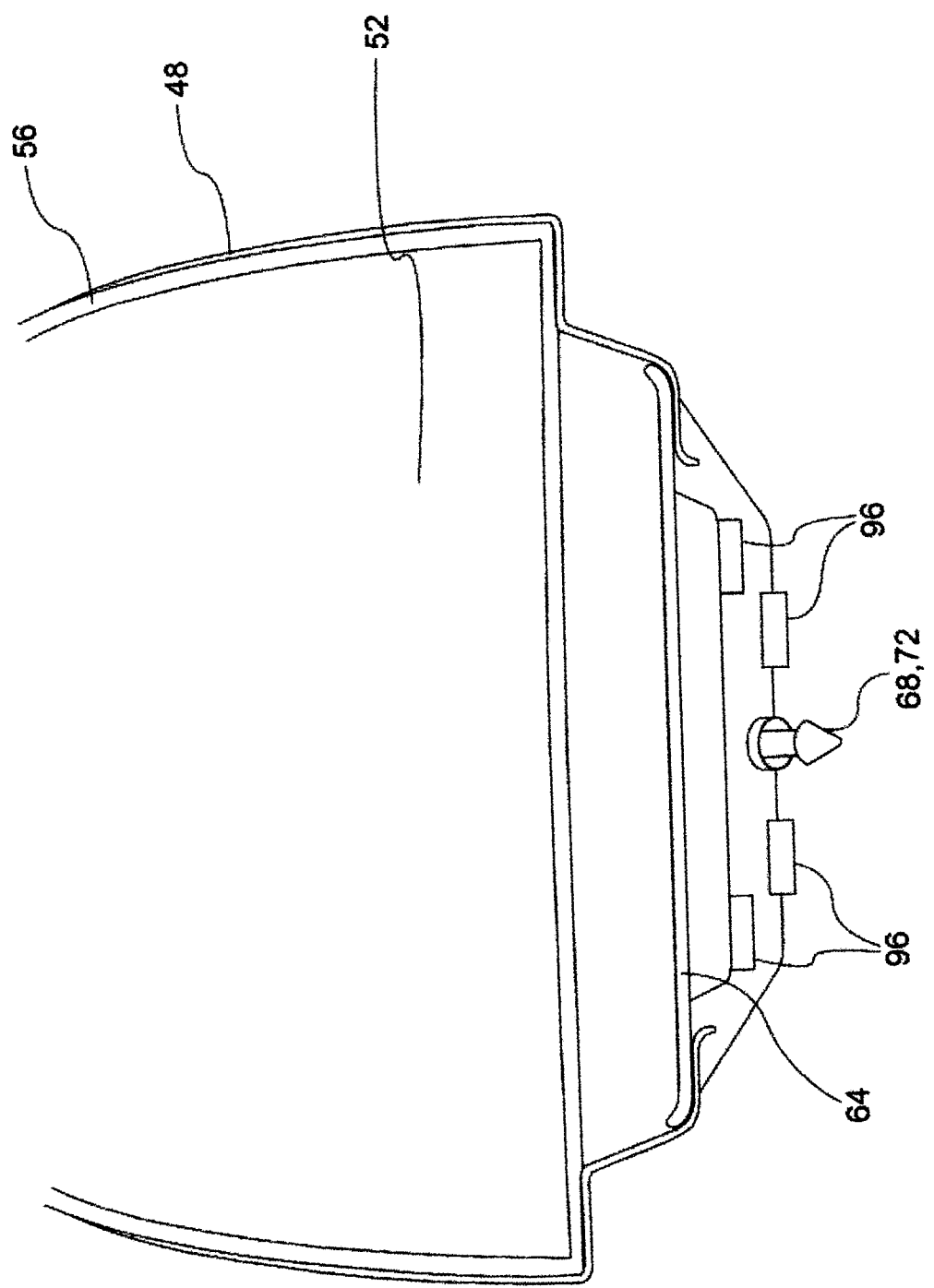
FIG. 4 is a side view of the fixing plate of a travel container according to this invention.
Figure 5:
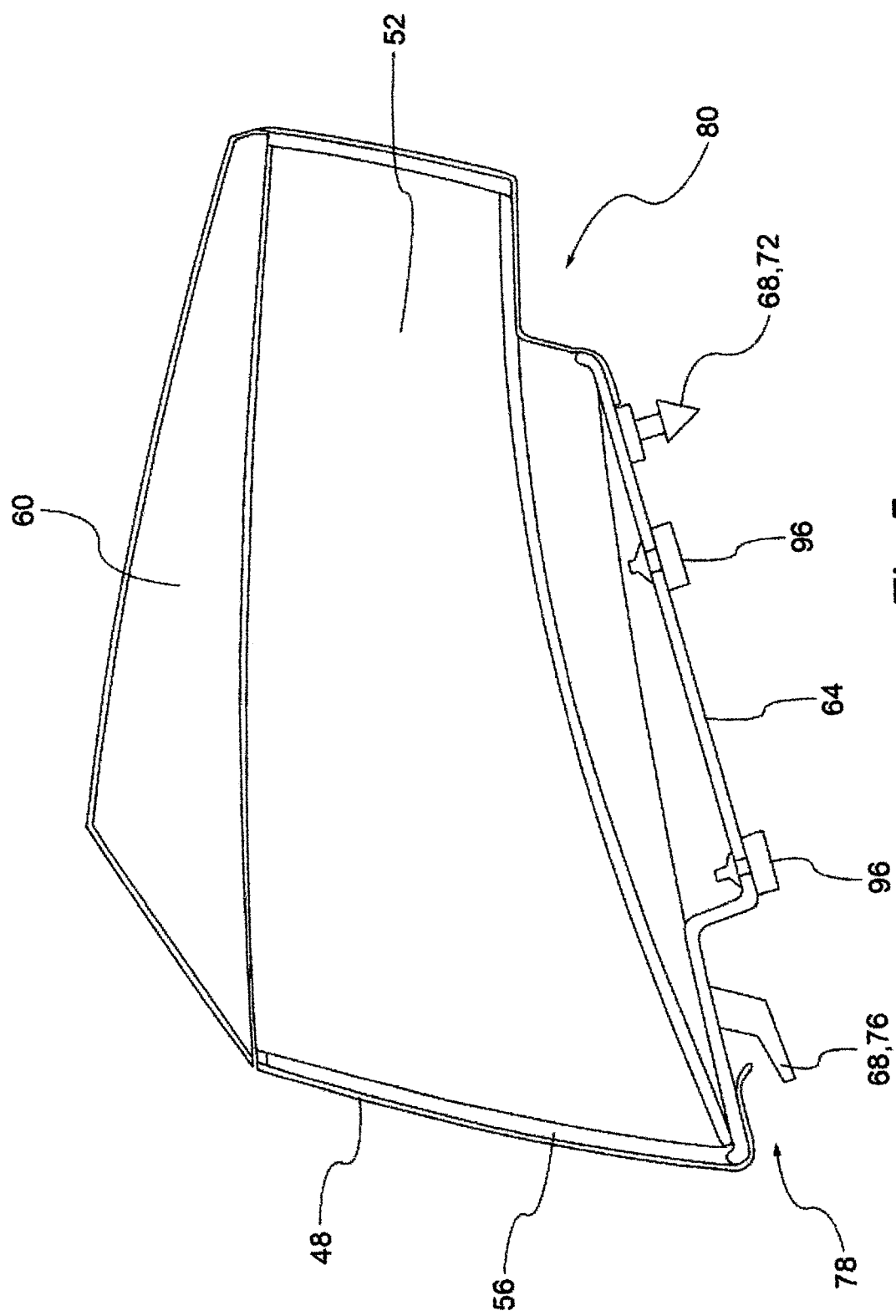
FIG. 5 is a longitudinal sectional view of the travel container of FIG. 4, along the section plane V-V of FIG. 4.
Figure 6:
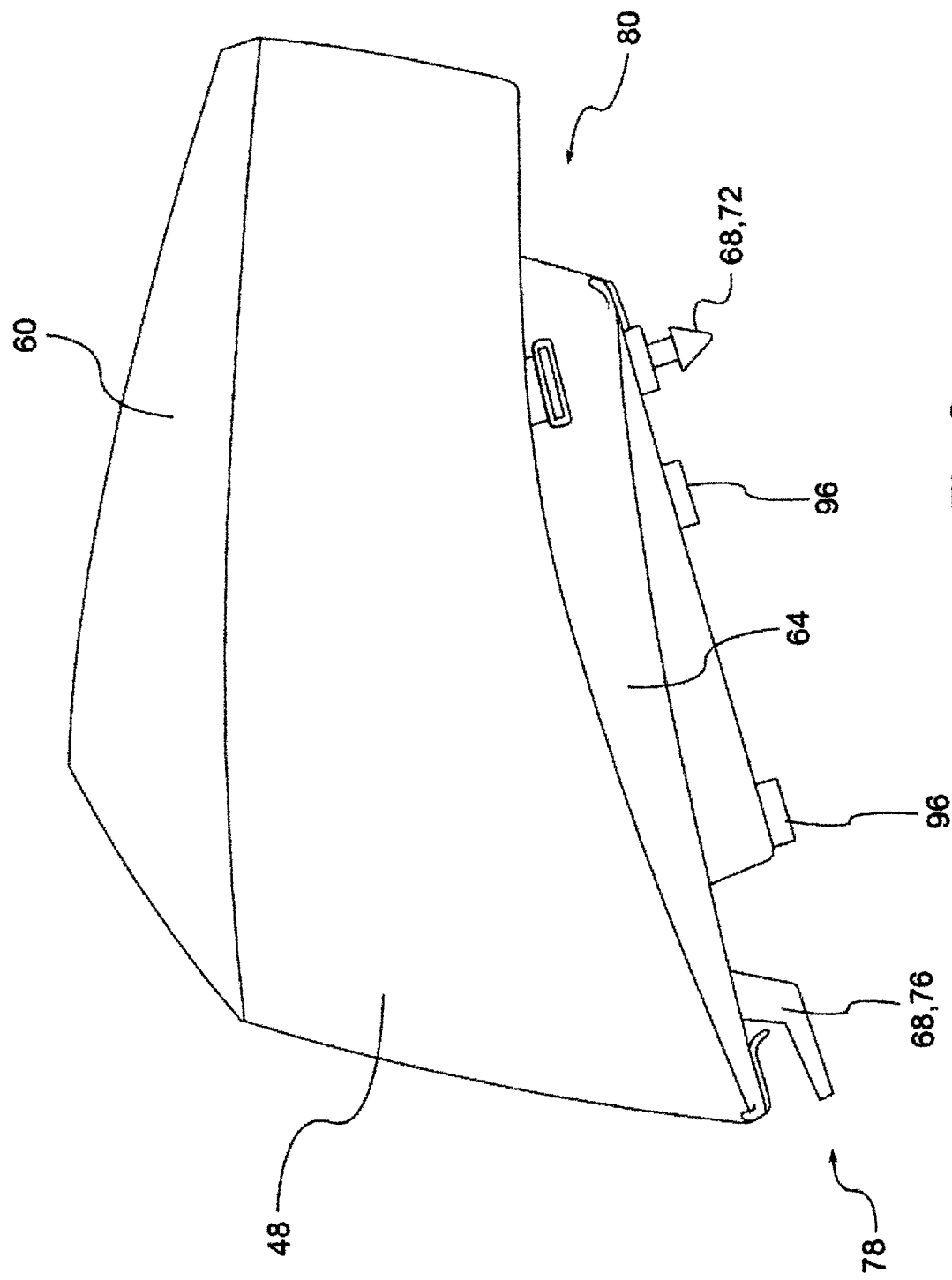
FIG. 6 is a side view of a travel container according to this invention, equipped with side fixing belts.
Figure 7:
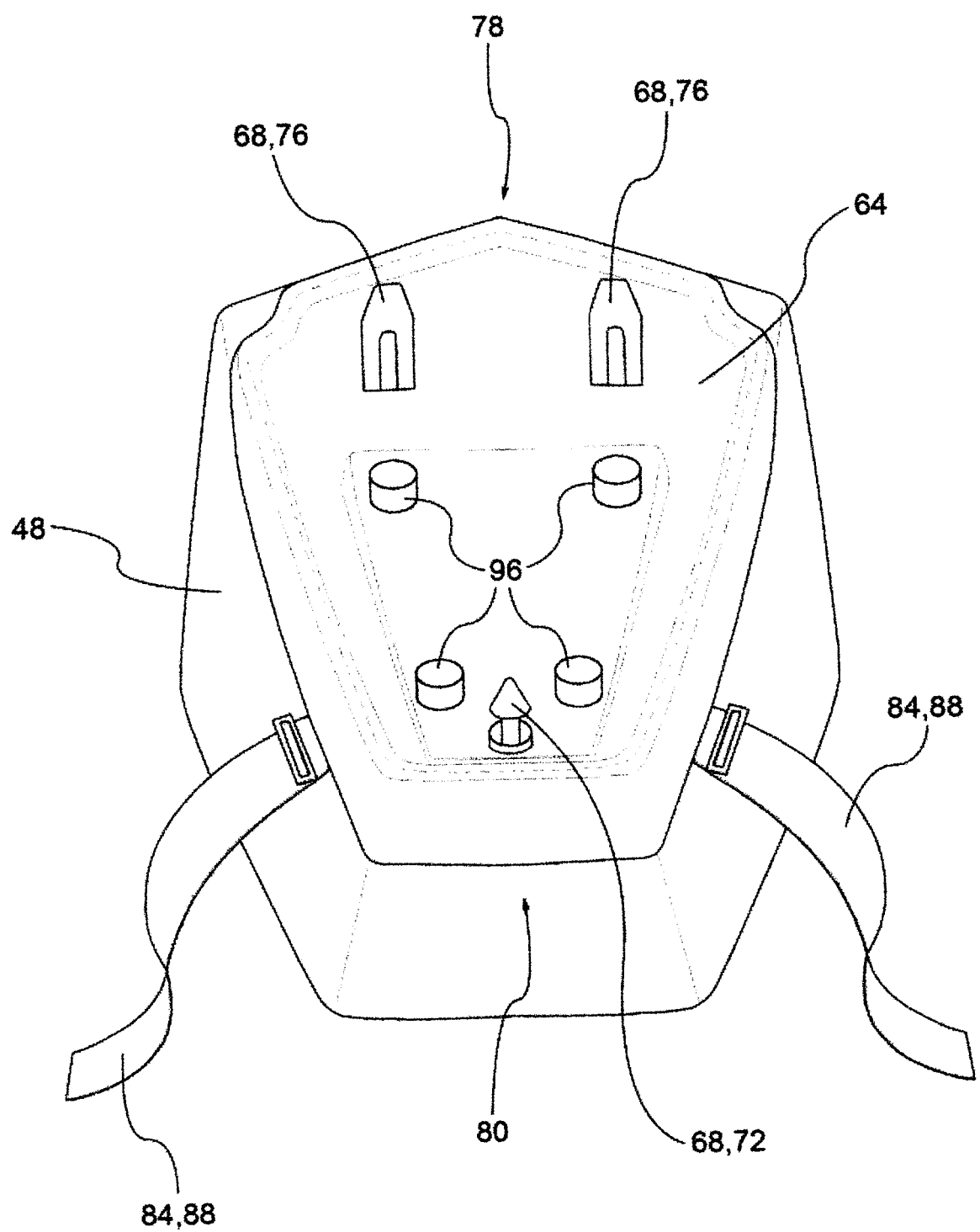
FIG. 7 is a bottom perspective view of the travel container according to this invention.
Figure 8:
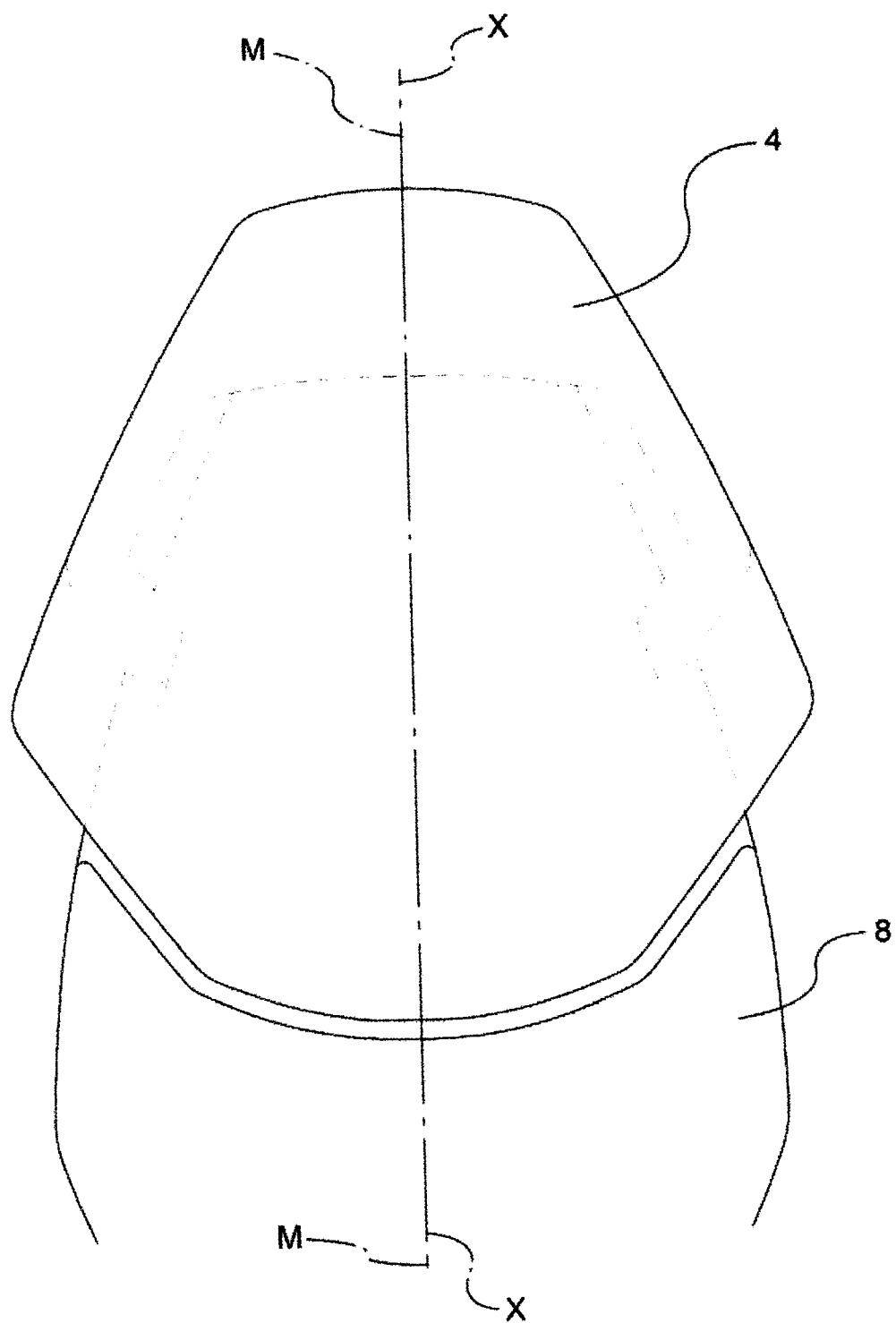
FIG. 8 is a top plan view of a travel container according to this invention, in a, fixing configuration on a motor vehicle.

With reference to the above figures, reference number 4 globally indicates an overall schematic view of a travel container according to this invention, applicable to a motor vehicle 8.

For the purposes of this invention, it should be clarified that the term motor vehicle must be considered in broad sense, encompassing any motorcycle having at least two wheels, namely a front wheel and a rear wheel. Thus, this definition also includes motorcycles having three wheels, of which, for example, two paired steering wheels on the front axle and a drive wheel on the rear axle, but also motorcycles that have a single steering wheel on the front axle and two drive wheels on the rear axle. Finally, this definition of motorcycle also includes so-called quadricycles, having two wheels on the front axle and two wheels on the rear axle.

Furthermore, for the purposes, of this invention, travel container means any type of container such as a travel case, bag, trolley, suitcase and the like.

The motor vehicle 8 is provided with a frame 12 provided with anchoring points 32 for an associable seat 20.

The seat 20 is, in turn, equipped with a lower plate suitable to fix the seat 20 to the frame 12 of the motor vehicle 8 and a seat portion 28, opposite the lower plate 24, and suitable to realize a seat for a user. The removal of the seat 20 usually allows access to an under-seat compartment 30 that is usually used as a compartment for holding documents and/or tools for light maintenance of the motor vehicle.

As will be seen, this invention is applicable to any motor vehicle in the broad sense. For example, it is applicable to scooters in which the removal and/or lifting of the seat allows access to an under-seat compartment of considerable size, such as to be used as a storage compartment for one or more of the user's helmets.

For the purposes of this invention, it is assumed that the seat 20 is used to transport the passenger in such a way that it can be removed replaced by the travel container 4 (as better described below) without interfering with a further seat portion suitable for accommodating the driver of the motor vehicle.

In other words, this invention provides, preferably, that the seat 20 of the motor vehicle be at least in two W portions separable from each other, namely a portion intended for the driver and a portion intended for the passenger, the latter being separable and replaceable by said travel container.

It is also possible, for the purposes of this invention, to provide a seat 20 in a single piece that can accommodate both the driver and a passenger of the motor vehicle. In this case, the travel container 4 will be provided with a portion of seat suitable to accommodate the driver (not shown).

In known manner, the frame 12 of the motor vehicle includes anchoring points 32 suitable to allow a secure fixing to the seat 20.

For example, said anchoring points 32 comprise at least one hole 36 and at least one seat 40, in which the hole and the seat are separated with respect to a longitudinal direction X-X.

Preferably, the frame 12 comprises a pair of seats 40 arranged symmetrically with respect to a centre plane M-M parallel and passing through along said longitudinal direction X-X.

The frame 12 may also comprise abutment plates 44 suitable to constitute the supports for the lower plate 24 of the seat 20.

The travel container body 4 for motor vehicles comprises a container body 48 defining at least one storage compartment 52; for example, the container body can be provided with an inner core 56 to stiffen the internal structure of the shape and increase its load capacity. The container body 48 may be provided with a plurality of compartments as well as a bellows structure to increase capacity if necessary.

According to an embodiment, the travel container 4 can be fitted with wheels, like a trolley guide, as well as at least one handle (not shown) in order to facilitate movement after its detachment from the frame 12. In fact, the travel container of this invention, in the light of the fact that it can be fixed in a portion of the frame normally used to secure the seat 20 and therefore to the support of a passenger, can be dimensioned so as to also allow a load of various tens of kilos in complete safely and without the risk of having an unbalanced load that could compromise the dynamics of the vehicle. This load of several tens of kilograms is, in fact, always positioned in the longitudinal shape of the vehicle and, therefore, is never projecting so as to compromise the dynamics.

The presence of wheels and a handle can greatly facilitate the handling of the travel container, even in conditions of maximum load.

According to a possible embodiment the container body 48 comprises at least one additional compartment 60, separate from said storage compartment 52, suitable to accommodate the seat 20 of the motor vehicle removed to allow the attachment of the travel container itself to its place.

In addition, the travel container 4 comprises a fixing plate 64 associated with said container body 48, said fixing plate 64 being provided with fixing means 68 for fixing the travel container to the frame 12 of the motor vehicle.

Advantageously, the fixing plate 64 is shaped so as to engage and hook to respective anchoring points 32 of the frame 12 of the associable motor vehicle, said anchoring points 32, in the configuration of non-use of the travel container 4, accommodating and fixing a lower plate 24 of the seat 20 for a user of said motor vehicle.

The fixing plate 64 of the travel container 4 is interchangeable with the lower plate 24 of the seat 20.

In this way it is possible to provide for the hooking and unhooking of both the seat 20 that the travel container 4 from the anchoring points 16 of the frame 12 by means of, for example, the same key, or similar security mechanisms, of which the motor vehicle is usually equipped.

This allows keeping the same alignment of the travel container with the vehicle as is the case for the passenger side seat.

In other words, the fixing means 68 of the fixing plate 64 are perfectly compatible, and preferably identical, with the fixing means (not shown) of the lower plate of the seat 20 and with the anchoring points 32 of the frame 12 intended for the fixing of the lower plate 24 of the seat 20. Therefore, the travel container 4 is provided with fixing means 68 that perfectly engage the anchoring points 16 of which the frame 12 of the motor vehicle is already equipped, without requiring any changes to the frame 12 of the motor vehicle itself.

For example, the same manufacturer of the lower plate 24 of the seat 20 will produce the fixing plate 64 of the travel container 4, so as to exploit the same component for the realization of both the seat 20 and the travel container 4.

Preferably, the fixing plate 64 of the travel container 4 is identical to lower plate 24 of the seat 20.

The correspondence between the fixing plate 64 of the travel container 4 and the lower plate 24 of the seat involves the same overall dimensions and therefore ensures that the fixing plate 64 of the travel container 4 is perfectly integrated, in the assembly configuration, in the frame 12 of the motor vehicle. In other words, the fixing plate 64 of the travel container 4 is perfectly set inside the frame 12, just like the lower plate 24 of the seat 20, and does not exceed the overall dimensions of the frame itself.

According to an embodiment, the fixing means 68 of the fixing plate 64 comprise at least one fixing hook 72 and at least one contrast tab 76 arranged at opposite longitudinal ends 78,80 of the fixing plate 64, with respect to a longitudinal direction X-X.

The fixing hook 72 is suitable to lock in the hole 36 of the frame 12 and each contrast tab 76 is suitable to be inserted into a corresponding seat 40 of the frame 12. Preferably, the connection between the fixing means 68, whether they are the fixing hook 72 and/or contrast tabs 76, and the respective anchoring points 32, whether they are holes 36 and/or the seats 40, realizes a shape-connection.

He said shape-coupling realizes an undercut for lifting and, then, removing seat 20 from the frame 12.

According to an embodiment, the travel container 4 is provided with additional fixing means 84 which comprise at least one strap 88 suitable to be wrapped and fixed around a frame portion 12 of the associable motor vehicle 8.

Preferably, the additional fixing means 84 are arranged in correspondence of the fixing means 68, along the longitudinal direction X-X.

For example, the fixing means 68 of the travel container 4 comprise at least one fixing hook 72 and said fixing strap 88 is positioned longitudinally in correspondence with said fixing hook 72.

The fixing hook 72 is, for example, movable and operatively connected to opening/closing means (not shown) for the removal/fixing of the travel container 4 and the seat 20.

For example, the opening and closing means are the key mechanisms of which the motor vehicle is usually supplied; the actuation of the key enables the movement of the fixing hook 72 and therefore the unlocking and removal of the lower plate 24, for the removal/fixing of the seat 20, as well as the unlocking and the removal of the fixing plate 64, for the removal/fixing of the travel container 4.

According to an embodiment, the fixing plate 64, on the side opposite to the storage compartment 52, comprises support feet 96, suitable to abut against frame portions 12 of the associable motor vehicle. In particular, the support feet are shaped so as to abut against the abutment plates 44 of the frame 12 of the motor vehicle which, in the configuration of non-use of the travel container, receive in abutment and support portions of the lower plate 24 of the seat 20.

This invention also comprises a mounting kit of the travel container for motor vehicles.

In particular, the kit comprises a seat 20 for motor vehicle having a lower plate 24 suitable to be secured to a frame portion 12 of the motor vehicle and a seat portion 28, opposite to the lower plate 24, and suitable to realize a seat for a user; the kit also comprises a travel container 4 provided with a container body 48, defining at least one storage compartment 52, and a fixing plate 64 associated with said container body 48, said fixing plate 64 is provided with fixing means 68 for the travel container 4 to the frame 12. The fixing plate of the kit of the travel container 4 is interchangeable with the lower plate 24 of the seat 20, so as to allow the attachment of the travel container 4 on the frame 12 of the motor vehicle, at said seat 20, after the removal of the seat itself.

Preferably, the fixing plate 64 of the travel container 4 is identical to lower plate 24 of the seat 20.

We will now describe the method of use of a travel container for motorcycles according to this invention.

In particular, one starts first with the removal of the passenger seat 20 in order to have access to the under-seat compartment 30.

As seen, the seat 20, is fixed to the frame 12 of the motor vehicle by means of a lower plate 24 suitable to be secured to a frame portion of the motorcycle; opposite the lower plate 24, there is then a seat portion 28 for a user/passenger.

The seat 20 can be removed by, for example, acting on the opening/closing means, typically key-operated, of the seat that allow the handling and unhooking of at least one of the fixing means of which the seat 20 is provided.

The removal of the seat 20 allows free access to the under-seat compartment 30 and, thus, to the frame portion 12 of the motor vehicle used to support the seat 20.

The seat of the motor vehicle removed, can be stowed away or it can be conveniently (and preferably) housed within the same travel container, in particular, in the additional compartment 60 of the travel container 4, separate from said storage compartment 52.

Preferably, the additional compartment 60 is separated from the storage compartment so as to maintain the seat 20 removed separated from the contents of the storage compartment 52.

The additional compartment 60 may be, for example, counter-shaped with respect to the seat 20 so as to exclusively accommodate the seat 20, without resulting in larger overall dimensions with respect to the seat itself.

Then, one proceeds to couple the travel container 4 in place of the passenger seat so as to have the fixing plate 64 of the travel container 4 close the under-seat compartment 30.

The travel container 4 is fixed on the frame 8 using the fixing means 68 of the fixing plate 64, which are identical to those of the seat 20. This coupling or fixing can be facilitated by, for example, acting on the closing means, typically key-operated, of which the motor vehicle is provided for fixing the passenger seat.

With the fixing of the travel container 4 to the frame 12, one hooks the fixing plate 64 of the travel container 4 to the frame portion 12 used to support the seat, i.e., the anchoring points 16; the travel container 4 is disposed in correspondence to, and replacement of, said seat covering the under-eat compartment 30.

The fixing of the travel container 4 to the frame 12 can be completed with the aid of additional fixing means comprising at least one strap 88 that can be passed around the frame and then tightened and locked.

Once fixed to the frame, the travel container 4 can be conveniently filled using the various compartments and pockets and possibly increasing the volume via, for example, the cited bellows.

In case of removal, the travel container 4 can be easily unhooked using the cited key-operated opening/closing means; then the opening of the under-seat compartment 30, freed as a result of the removal of the travel container 4, can be easily closed by repositioning the seat 20.

The travel container can then also be moved by exploiting the special wheels, like a trolley, if available.

As can be appreciated from the description, the travel container according to the invention allows overcoming the drawbacks presented in the prior art.

In particular, the travel container can advantageously be fixed in correspondence to the passenger seat with significant advantages with respect to the solutions of the known art. In fact, the travel container does not have load limits related to safety issues such as occurs with the travel cases of the prior art that, due to problems of overall dimensions or projecting positioning, can never exceed certain load capacities (typically equal to about ten kilos). The travel holder according to this invention does not present any safety problem since it is positioned in correspondence of a portion of the frame of the motor vehicle already used and dimensioned to support the load of a passenger, so equal to several tens of kilos.

Moreover, the means of fixing the travel container are secure and reliable since they are also dimensioned to support a load equal to that of a passenger.

Moreover, the travel container according to this invention is positioned, as seen, in correspondence to the passenger: in this way, there is never an imbalance or loss of equilibrium of the load, at least not outside of the design parameters of the motor vehicle.

Moreover, the load is symmetrical with respect to a longitudinal plane of symmetry (i.e., in the driving direction) of the motor vehicle: in this way, there is no loss of the lateral equilibrium of the load.

Moreover, the travel container can be conveniently used as a support for the driver's back.

Moreover, the travel container is disposed behind the driver and so as not to interfere in any way with the movements of the driver, especially of the arms, or with the driver's view, as would happen instead in the case of use of front bags on the tank.

Moreover, the tank cap is always free and easily accessible: there is no interference with the operations of refuelling petrol, as happens with the tank travel cases of the prior art.

In addition, the solution of this invention does not involve any change or addition to the frame of the motorcycle. In fact, the known solutions often use belts fixed and fastening plates, especially at the rear; such known solutions also provide for the use of special keys, which are uncomfortable for a user who often has to manage, in addition to the ignition key of the vehicle, also one or more keys for arming/disarming of anti-theft devices for the motor vehicle.

These fastening means are usually fixed to the frame of the vehicle: in this way, even if one is not using and, therefore, removes the travel container, these fastening means remain always fixed to the frame, compromising the aesthetics and increasing the mass.

While the solution of this invention is easily removed, for example, to replace the original seat, with leaving any appendix, strip or plate on the motor vehicle and without compromising the aesthetics.

Moreover, as seen, it is possible to provide for the hooking and unhooking of the travel container to the frame of the motor vehicle, without using a special key of the container but using, conveniently, the same key of which the motor vehicle is normally provided to allow the fastening and removal of the seat. So, on the one hand, it avoids the inconvenience for the user of having an additional special key and, on the other, allows a secure and reliable fastening of the container to the frame. In fact, the hooks normally used for the fixing of the seat to the frame of the motor vehicle must pass particularly rigorous mechanical resistance and fatigue tests. Therefore, the fastening of the travel container to the frame, using the same lower plate of the seat, and therefore the same attachments, ensures compliance with the criteria of maximum reliability and resistance required for the approval of the motor vehicle.

Finally, advantageously, compared to the solutions of the prior art, the solution of this invention does not require disassembling any component or using any tools.

In fact, there is no need to mount fixed plates between the motor vehicle and the travel container, no need for screwdrivers, Allen wrenches or hex wrenches to remove screws or pins of any kind, since one must only release the seat and put the travel container in its place by simply acting with the key provided with the motor vehicle.

Obviously this solution also implies an economic saving in terms of the production of the travel container. In fact, there is no need to use a special fixing plate for the travel container, but it is sufficient to use the same lower plate of the seat: so, the manufacturer of the travel container can use the same component used by the manufacturer of the seat.

In addition, as seen, the correspondence between the fixing plate of the travel container and the lower plate of the seat involves the same overall dimensions and therefore ensures that the fixing plate of the travel container is perfectly integrated, in the assembly configuration, in the frame of the motor vehicle. In other words, the fixing plate of the travel container is perfectly set inside the frame, just like the lower plate of the seat, and does not exceed the overall dimensions of the frame itself.

This containment of the overall dimensions is additionally advantageous since such a plate is a rigid element and, therefore, the fact that it is perfectly set inside the frame prevents the user from accidentally coming in contact with the plate itself. So, it improves the comfort of the user, who can still move freely on the seat without coming in contact with the fixing plate and, in case of a fall, it avoids the risk that the user could come in contact with portions of the fixing plate, which typically constitutes a metal piece with sharp corners. So, risks for the driver are limited with respect to the solutions of the known art.

In addition, the use of a fixing plate of small size, so as to be integrated into the frame of the motor vehicle, helps to reduce the overall mass of the travel container. This also results in an advantage when the user, after replacing the seat on frame, must carry the travel container with him. In this condition, it is useful to have a total mass that is as contained as possible, to facilitate the operations of manual transport of the travel container. Furthermore, as seen, a fixing plate of small dimensions is also easily storable inside the travel container itself, so as not to have loose parts and, at the same time, so as not to significantly reduce either the overall dimensions or the load capacity of the travel container.

A person skilled in the art, in order to satisfy contingent and specific needs, may make numerous modifications and variations to the travel containers described above, all however contained within the scope of the invention as defined by the following claims.

The invention claimed is:

1. A travel container for motor vehicles, the travel container comprising:
  a container body defining at least one storage compartment,
  a fixing plate associated with said container body, said fixing plate being provided with a mounting assembly for the travel container,
  said mounting assembly being defined by portions of the fixing plate shaped so as to engage and hook to respective anchoring points of a frame of a rear portion of an associable motor vehicle, said anchoring points, in a configuration of non-use of the travel container, accommodating and fixing a lower plate of a passenger side seat for a user passenger of said motor vehicle;
  wherein the mounting assembly comprises a first tab, a second tab, and a fixing hook; the first tab and the second tab each having a first portion extending outward from the fixing plate and a second portion extending along and spaced apart from the fixing plate; the second portions of the first and second tabs being configured to insert into corresponding first and second receiving seats of the frame of the motor vehicle, and the fixing hook being configured to extend into a hole of the frame of the motor vehicle; and
  wherein the container body comprises at least one additional compartment, separate from said storage compartment, said additional compartment accommodating the passenger side seat of the motor vehicle removed to allow attachment of the travel container.

2. A travel container for motor vehicles according to claim 1, wherein the fixing plate of the travel container is interchangeable with the lower plate of the passenger side seat.

3. A travel container for motor vehicles according to claim 1, wherein the fixing plate of the travel container is identical to the lower plate of the passenger side seat.

4. A travel container for motor vehicles according to claim 1, wherein the travel container further comprises at least one strap wrapped and fixed around a frame portion of the associable motor vehicle when the container is mounted to the associable motor vehicle.

5. A travel container for motor vehicles according to claim 1, wherein the container body comprises at least one additional compartment, separate from said storage compartment, configured to accommodate the passenger side seat of the motor vehicle removed to allow the attachment of the travel container.

6. A travel container for motor vehicles according to claim 1, wherein the fixing plate, on the side opposite to the storage compartment, comprises support feet against frame portions of the associable motor vehicle when mounted to the motor vehicle.

7. A motor vehicle comprising a travel container according to claim 1.

8. A travel container for motor vehicles according to claim 1, wherein the mounting assembly of the fixing plate is interchangeable with a seat mounting assembly of the lower plate of the passenger side seat and with the anchoring points of the frame for fixing of the lower plate to the passenger side seat.

9. A travel container for motor vehicles according to claim 1, wherein the fixing plate of the travel container is set inside the frame of the motor vehicle in the assembly configuration.

10. A travel container for motor vehicles according to claim 1, wherein the travel container is shaped as a support for a driver's back.

11. A travel container for motor vehicles according to claim 1, wherein the hole is positioned along a longitudinal axis of the frame and the first receiving seat and the second receiving seat are spaced apart on opposite sides of the longitudinal axis of the frame.

12. A travel container for motor vehicles according to claim 11, wherein the first tab and the second tab are spaced apart longitudinally from the fixing hook.

13. A travel container for motor vehicles according to claim 1, wherein said additional compartment is complementary-shaped with respect to the passenger side seat to exclusively accommodate the passenger side seat without increasing an overall dimension of the seat.

14. A method for fixing a travel container for motor vehicles to a motor vehicle, the method comprising the steps of:
arranging a motor vehicle provided with at least one back passenger side seat, fixed to a frame of the motor vehicle, the passenger side seat being provided with a lower plate securable to a frame portion of the motor vehicle and a seat portion, opposite to the lower plate, and configured as a seat for a passenger;
arranging a travel container provided with a container body, defining at least one storage compartment, and a fixing plate associated with said container body, said fixing plate being provided with a mounting assembly for the travel container, said mounting assembly being defined by portions of the fixing plate shaped to engage and hook with respective anchoring points of the frame of the motor vehicle;
wherein the fixing plate of the travel container is interchangeable with the lower plate of the passenger side seat;
removing the passenger side seat so as to leave free access to an under-seat compartment and to the frame portion of the motor vehicle used for support of the passenger side seat;
fixing the travel container to the motor vehicle, so as to fix the fixing plate of the travel container to the frame portion used to support the passenger side seat, the travel container being arranged at and in replacement of said passenger side seat;
wherein the mounting assembly comprises a first tab, a second tab, and a fixing hook; the first tab and the second tab each having a first portion extending outward from the fixing plate and a second portion extending along and spaced apart from the fixing plate; the method comprising inserting the second portions of the first and second tabs into corresponding first and second receiving seats of the frame of the motor vehicle, and locking the fixing hook in a hole of the frame of the motor vehicle;
arranging an additional compartment of the travel container, separate from said storage compartment, said additional compartment containing the passenger side seat of the motor vehicle;
inserting the passenger side seat removed from the frame in said additional compartment.

15. A method according to claim 14, wherein the fixing plate of the travel container is identical to the lower plate of the passenger side seat.

16. A method according to claim 14, wherein the fixing plate of the travel container is fixed directly in contact with the frame portion of the motor vehicle, so as to interface with the mounting assembly of the fixing plate directly with said anchoring points of the frame of the motor vehicle used for anchoring the passenger side seat of the motor vehicle.

17. A method according to claim 14, comprising the further steps of:
providing the travel container with at least one belt,
attaching the strap to said frame of the motor vehicle.

18. The method according to claim 14, comprising inserting the first and second tabs by moving the second portions along a surface of the frame into the corresponding receiving seats, and inserting the fixing hook into the hole in the frame.

19. The method according to claim 18, wherein the hole is positioned along a longitudinal axis of the frame and the first receiving seat and the second receiving seat are spaced apart on opposite sides of the longitudinal axis of the frame.

20. The method according to claim 19, wherein the first tab and the second tab are spaced apart longitudinally from the fixing hook.

21. A mounting kit of a travel container for motor vehicles, the mounting kit comprising:
a passenger side seat for a motor vehicle having a lower plate securable to a frame portion of the motor vehicle and a seat portion, opposite to the lower plate, and configured as a seat for a passenger,
a travel container interchangeable with the passenger side seat, the travel container provided with a container body, defining at least one storage compartment, and a fixing plate associated with said container body, said fixing plate comprising a mounting assembly for the travel container,
said mounting assembly being defined by portions of the fixing plate shaped so as to engage and hook to respective anchoring points of the frame of the motor vehicle;
wherein the fixing plate of the travel container is interchangeable with the lower plate of the passenger side seat, so as to allow attachment of the travel container on the frame of the motor vehicle, at said seat, after removal of the passenger side seat;

wherein the mounting assembly comprises a first tab, a second tab, and a fixing hook; the first tab and the second tab each having a first portion extending outward from the fixing plate and a second portion extending along and spaced apart from the fixing plate; the second portions of the first and second tabs being configured to insert into corresponding first and second receiving seats of the frame of the motor vehicle, and the fixing hook being configured to extend into a hole of the frame of the motor vehicle; and wherein the container body comprises at least one additional compartment, separate from said storage compartment, said additional compartment accommodating the passenger side seat of the motor vehicle removed to allow attachment of the travel container.

22. A mounting kit according to claim 21, wherein the fixing plate of the travel container is identical to the lower plate of the passenger side seat.

23. A mounting kit according to claim 21, wherein the travel container of said kit comprises:
a container body defining at least one storage compartment;
a fixing plate associated with said container body, said fixing plate being provided with a mounting assembly for the travel container;
said mounting assembly being defined by portions of the fixing plate shaped so as to engage and hook to respective anchoring points of a frame of an associable motor vehicle, said anchoring points, in a configuration of non-use of the travel container, accommodating and fixing a lower plate of a seat for a user of said motor vehicle.

24. A mounting kit according to claim 23, wherein the mounting assembly on the fixing plate of the container is interchangeable with a seat mounting assembly of the lower plate of the passenger side seat and with the anchoring points of the frame for fixing of the lower plate of the passenger side seat.

25. A mounting kit according to claim 23, wherein the fixing plate of the travel container is set inside, in the assembly configuration, in the frame of the motor vehicle.

26. A mounting kit according to claim 23, wherein the fixing plate of the travel container is identical to the lower plate of the passenger side seat.

27. A mounting kit according to claim 23, wherein the travel container is conformed as a support for a driver's back.

28. A mounting kit according to claim 21, wherein the hole is positioned along a longitudinal axis of the frame and the first receiving seat and the second receiving seat are spaced apart on opposite sides of the longitudinal axis of the frame.

29. A mounting kit according to claim 28, wherein the first tab and the second tab are spaced apart longitudinally from the fixing hook.

* * * * *